(12) United States Patent
Bolin et al.

(10) Patent No.: US 7,672,482 B2
(45) Date of Patent: Mar. 2, 2010

(54) SHAPE DETECTION USING COHERENT APPEARANCE MODELING

(75) Inventors: Mark R. Bolin, Fairport, NY (US); Peter O. Stubler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 960 days.

(21) Appl. No.: 11/383,503

(22) Filed: May 16, 2006

(65) Prior Publication Data

US 2007/0269111 A1  Nov. 22, 2007

(51) Int. Cl.
*G06K 9/00* (2006.01)
(52) U.S. Cl. .................... 382/103; 382/107
(58) Field of Classification Search ............ 382/103, 382/107
See application file for complete search history.

(56) References Cited

U.S. PATENT DOCUMENTS

| | | | |
|---|---|---|---|
| 5,774,129 | A | 6/1998 | Poggio et al. |
| 6,188,776 | B1 | 2/2001 | Covell et al. |
| 6,222,939 | B1 | 4/2001 | Wiskott et al. |
| 2003/0146918 | A1* | 8/2003 | Wiles et al. .......... 345/582 |

FOREIGN PATENT DOCUMENTS

WO  WO 01/35326  5/2001

OTHER PUBLICATIONS

Zhang et al ("Zhang") (Robust Face Alignment Based on Local Texture Classifiers, Image Processing, 2005. ICIP 2005. IEEE International Conference on vol. 2, Sep. 11-14, 2005 pp. II-354-II-357.*
Pentland et al.; View-Based and Modular Eigenspaces for Face Recognition; Proc. IEEE Conf. Computer Vision and Pattern Recognition, pp. 84-91, 1994.
Cootes et al.; Active Shape Models—Their Training and Application; Computer Vision and Image Understanding, vol. 61, No. 1, pp. 38-59, 1995.
Yuille et al.; Feature extraction from faces using deformable templates; IEEE Conf. on Computer Vis. and Pat. Recog., pp. 104-109, 1989.
Cootes et al.; Active Appearance Models; Proc. European Conf. on Computer Vision 1998, vol. 2, pp. 484-498.

* cited by examiner

*Primary Examiner*—Tom Y Lu
(74) *Attorney, Agent, or Firm*—Nelson A. Blish

(57) ABSTRACT

A method of finding an object in an image that consists of describing an object shape by one or more sets of feature points (220); estimating positions of the feature points (310); finding new locations for each feature point based on an appearance model of an aggregate appearance of the object in local neighborhoods of all features points (320); and constraining the positions of the feature points based on a shape model (330).

29 Claims, 8 Drawing Sheets

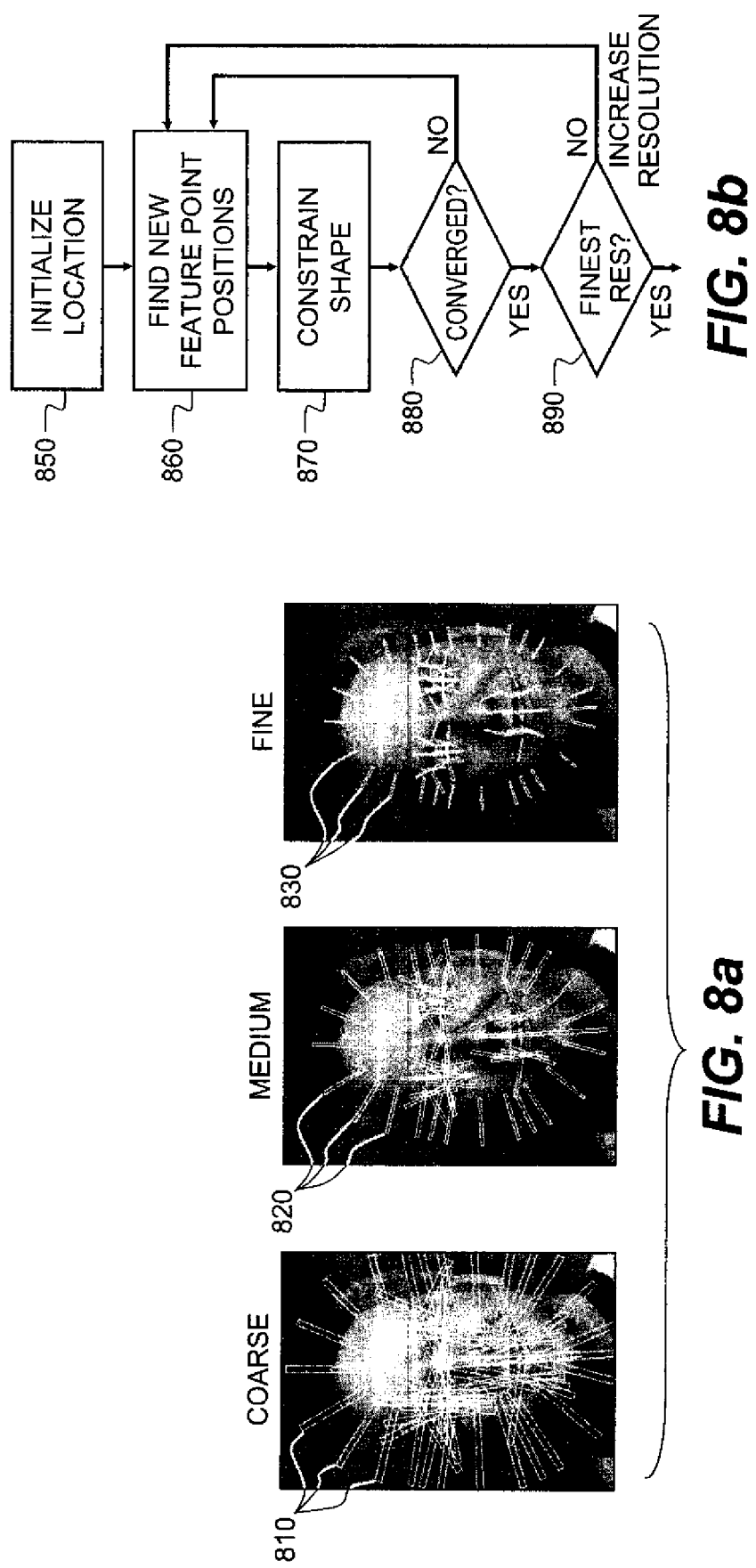

SHAPE DETECTION USING COHERENT APPEARANCE MODELING

FIELD OF THE INVENTION

The invention relates generally to the field of digital image processing, and in particular to the field of automatic object detection.

BACKGROUND OF THE INVENTION

The ability to find objects, and in particular the shape of objects, in images is important for a large number of applications. These applications include object detection, recognition, classification, verification, and tracking. There are needs to find objects in photographs, as well as medical imagery, and video. Specific examples of such applications include identifying the locations of facial features for portrait retouching and red-eye removal, locating the boundary of the lungs or the borders of the breast in x-ray images for computer aided diagnosis, and eye tracking in video for immersive displays.

A useful way to identify the shape of an object in an image is by locating a set of feature points. These points are often designated to indicate the positions of semantically meaningful or readily recognizable locations. Examples include the center of an eye or the tip of a nose, or a series of points that indicate a contiguous border such as the outline of a face.

Early methods for detecting feature points sought to identify each feature point in isolation. One such method is proposed in the paper by Pentland et al., "View-Based and Modular Eigenspaces for Face Recognition," *Proc. IEEE Conf. Computer Vision and Pattern Recognition*, pp. 84-91, 1994. In their work, Pentland et al. create a model of the expected appearance at a feature point using a principle components analysis (PCA) of a set of ground truth images. This model describes the space of expected appearances at a feature point by the mean appearance, the primary modes of appearance variation, and the expected range along these modes. Feature locations are found by investigating various image positions and selecting the one with the lowest distance to feature space (i.e. the minimal error between the appearance at the position and the closest appearance realizable using the model).

The location of each feature point can provide useful information about the positions of the other feature points. Finding each feature point individually fails to take advantage of this and generally leads to less reliable results. Modern methods for finding objects therefore incorporate a model of the shape of the object. This model can be used to constrain the results for individual feature points so that they conform to the expected shape of the entire object.

A popular method that employs such a shape model is described in Cootes et al., "Active Shape Models—Their Training and Application," *Computer Vision and Image Understanding*, Vol. 61, No. 1, pp. 38-59, 1995. In the active shape model technique, the positions of feature points are manually annotated on a set of ground truth images of an object. These feature locations are analyzed using PCA to develop a model of the shape. This model indicates the plausible relative positions of the feature points and the variability of these positions as an interdependent set. At each feature point an independent model of the local appearance around the point is also created. In order to automatically find an object in an image, a search is performed for each feature point to find the position that best matches the expected local appearance of that feature. The global shape model is then used to constrain the results of the local searches. This process repeats until the shape converges upon a stable result.

A number of other techniques have been suggested for finding objects using local appearance matching and shape model constraints. The use of deformable templates was suggested in the paper Yuille et al., "Feature Extraction from Faces using Deformable Templates," *IEEE Conf. on Computer Vis. and Pat. Recog.*, pp. 104-109, 1989. Deformable templates use a parameterized shape model and an energy minimization technique to find the best match of the shape model to the local appearance of the image. In U.S. Pat. No. 6,222,939 (Wiskott et al.) suggests the use of labeled bunch graphs for object detection. A labeled bunch graph models the local appearance at feature points using the response of Gabor wavelets and uses spring-like connections between the feature points to enforce an elastic shape constraint.

Methods have also been proposed to find the shape of objects using the global appearance of objects. The methods previously described use independent models of the local appearance at each feature point in order to perform matching at those points. However, methods based on the global appearance of an object use a model of the appearance across the entire object in order to simultaneously infer the locations of all feature points.

A popular method based on the global appearance of objects is described in Cootes et al., "Active Appearance Models," *Proc. European Conf. on Computer Vision* 1998, H. Burkhardt and B. Neumann Eds., Vol. 2, pp. 484-498, 1998. As in the Active Shape Model technique, feature points are manually annotated on a set of ground truth images of an object. PCA is performed on the locations of these points to develop a compact parameterized shape model. The ground truth images are then warped to the average shape and the appearance across the entire object is analyzed using PCA. This generates a parameterized model of the global appearance of the object that is largely independent of shape. By varying the model parameters and using multivariate linear regression, the algorithm learns how to adjust the parameters of the models to match an object based upon the residual error. In order to find an object in an image, this matching process is repeated until convergence, after which the parameters of the shape model can be used to infer the locations of the feature points. This method is used for object classification, verification, and synthesis in WO Patent No. 01/35326 A1.

Various other techniques have also been proposed for finding feature points based on the global appearance of objects. In U.S. Pat. No. 5,774,129 (Poggio et al.) describe a method that uses interleaved shape and texture matching. A shape normalized appearance model is constructed as in the Active Appearance Model technique. Objects are found in an image by using optic flow to determine the shape transformation between the object and a prototype with average shape and appearance. The object is then warped to the average shape and its appearance is constrained to the limits of the appearance model. The constrained appearance then forms the new target for the optic flow alignment and the process repeats. After the process converges, the shape transformation can be used to infer the positions of feature points. In U.S. Pat. No. 6,188,776 (Covell et al.) proposes the use of a coupled affine manifold model. Given an aligned object, this model enables the positions of the feature points to be directly inferred. An appearance only model is suggested to initially align the object.

Methods that seek to find feature points using independent local models of appearance fail to take advantage of the coherent appearance at the feature points. For instance, within a given face there is a consistent hair and skin color that can be shared across numerous feature points. The appearance at a given feature point can be a strong indication of the correctness of the match at surrounding feature points. Methods that find feature points using models of appearance that are global across the entire object are able to take advantage of this coherence; however, global appearance models weight all positions within the object equally. Equal weighting ignores the fact that some areas of an object have higher information content about the shape of the object than do others. For instance, the edges around the eyes and border of the face convey more shape information than do the uniform areas on the cheeks and forehead. Methods that are based on global appearance preclude the sort of engineering decisions that are inherent in the local appearance methods. In the local appearance methods the algorithm designer must decide what areas of the object have the highest information content and place feature points at those positions in order to obtain an accurate result. What is needed is a method that both exploits the coherent appearance across an object and still enables special emphasis to be placed on selected positions on the object.

SUMMARY OF THE INVENTION

The present invention is directed to overcoming one or more of the problems set forth above. Briefly summarized, according to one aspect of the present invention, a method is described for finding an object in an image comprising: describing an object shape by one or more sets of feature points; estimating positions of the feature points; finding new locations for each feature point based on a appearance model of an aggregate appearance of the object in local neighborhoods of all feature points; and constraining the positions of the feature points based on a shape model.

The appearance model that is employed in this invention is neither completely global nor local, but rather an aggregate model of the local appearances at the feature points. This enables the method to exploit the coherence of the appearance across an object while still placing special emphasis on selected positions within the object.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 8*a* is an illustration of the multi-resolution texture window positions for an example object (a face).

FIG. 8*b* is a flowchart of the multi-resolution method for finding objects.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
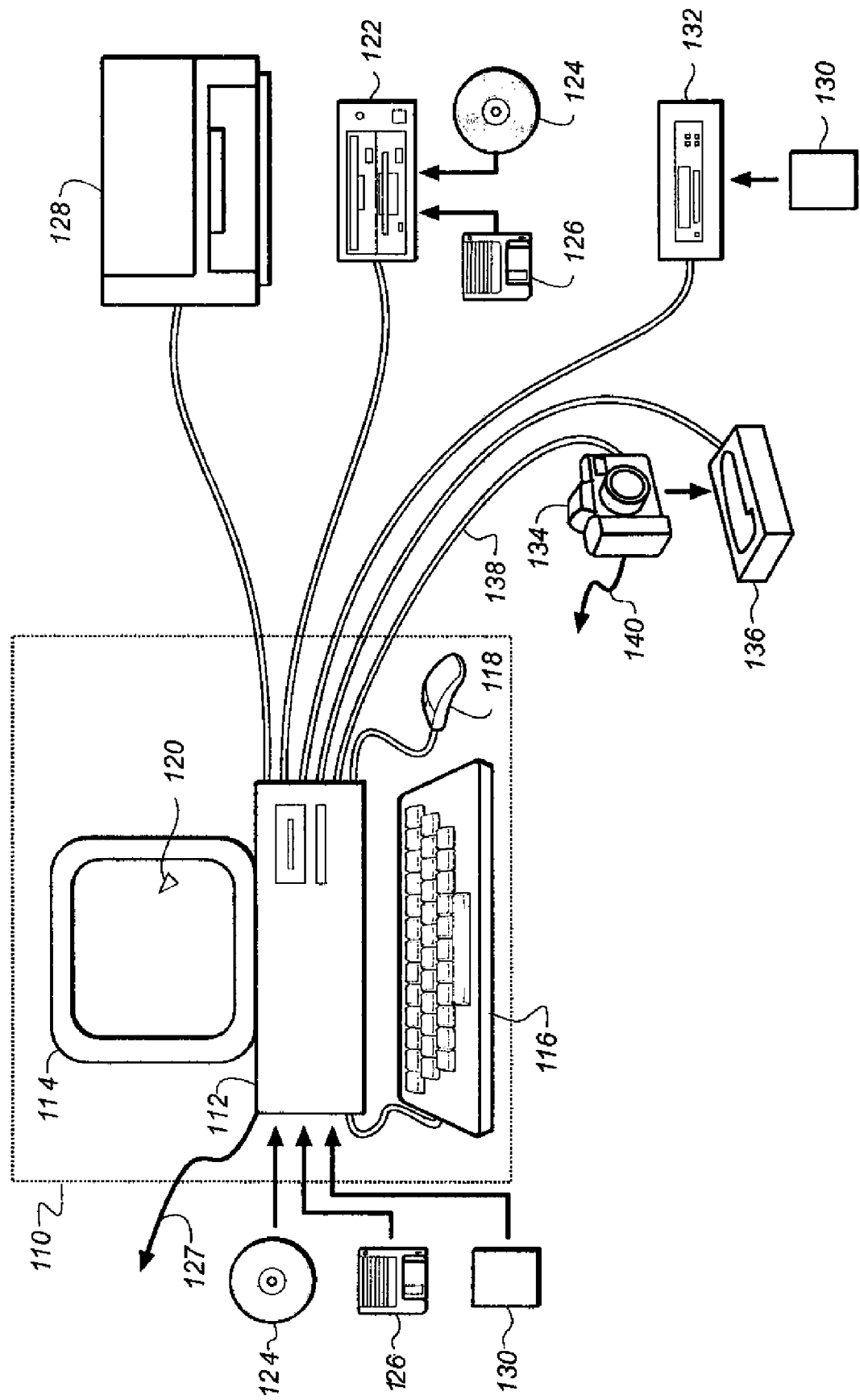
FIG. 1 is a schematic diagram of a computer system for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor-based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor-based unit for providing a means of inputting the software programs and other information to the microprocessor-based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm may be stored in any of the storage devices heretofore mentioned and applied to images in order to find an object, or in particular the shape of an object within an image.

Figure 2:
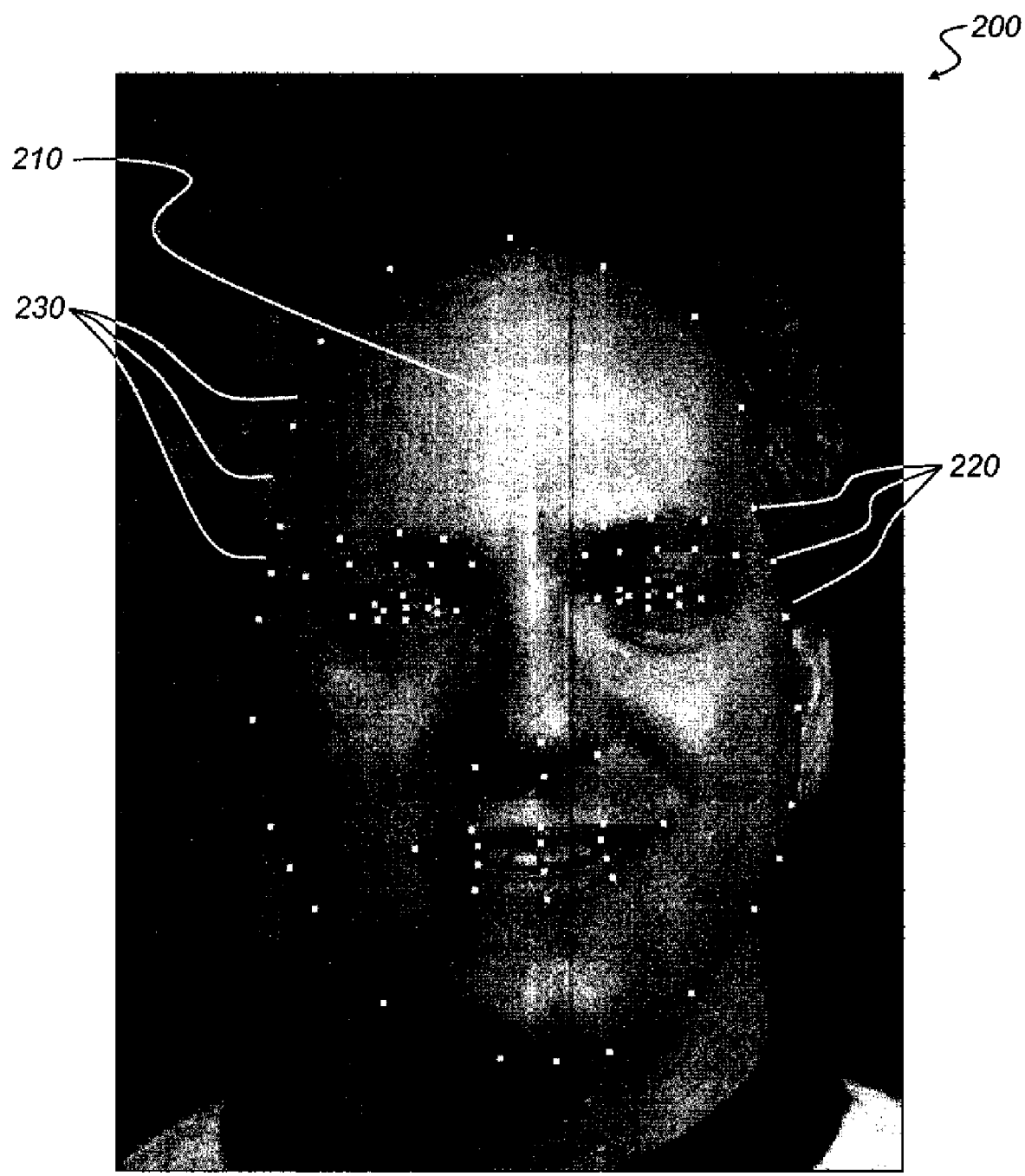
FIG. 2 is an illustration of the use of feature points to parameterize an example object (a face) within an image.

In the present invention it is useful to parameterize an object's shape with one or more sets of feature points. These feature points are usually identified by the designer of a specific implementation and are typically positioned to indicate semantically meaningful or readily recognizable locations. FIG. 2 contains an image 200 depicting an example object 210 of a face. Those skilled in the art will readily recognize that the invention is equally applicable to other objects depicted within an image. The shape of the object is parameterized by feature points 220. In this example, the feature points are positioned to indicate the border of the eyebrows, eyes, nose, mouth, and facial outline. Within the present invention it is useful, but not essential, to group the feature points into connected sets. The connections between feature points 230 may be used to indicate shape boundaries that implicitly define the orientation of the appearance windows and dominant search directions. If connections are not present, arbitrary directions can be assigned.

Figure 3:
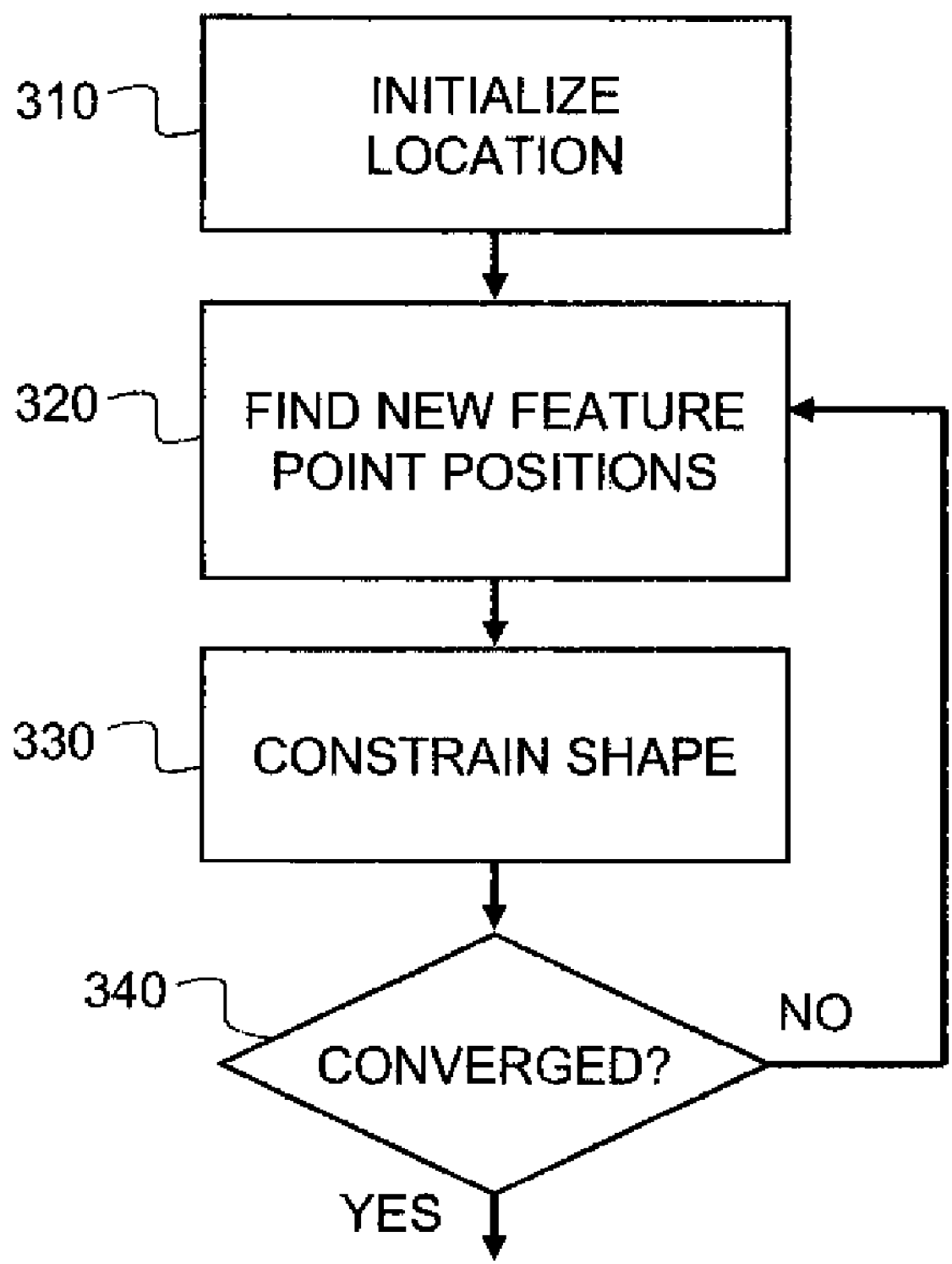
FIG. 3 is a flowchart of the method for finding objects.

Referring now to FIG. 3, a flow chart of the method of finding objects is shown. This invention seeks to find objects by identifying the locations of the feature points that parameterize the shape of the object. The method comprises the steps of initializing the location 310, finding new feature point positions 320, constraining the shape 330, convergence testing 340, and optionally repeating the final three steps until the shape converges upon a stable result.

In the "initialize location" step 310 the starting positions of the feature points are specified. In general, these locations should represent a best guess for the location of the object. Those skilled in the art will recognize that there are a variety of ways to estimate the initial feature locations that are consistent with the spirit of this invention. Potential methods include employing an appearance model for the entire object to perform automatic detection or having a user indicate the approximate position of the object. Once the approximate position of the object is known, the location of the feature points can be estimated by various means including aligning their average relative positions to the specified location.

The initial feature positions are then input to the "find new feature point positions" step 320. This step investigates the local neighborhoods around each feature point to find the positions that best match an aggregate model of the local appearances at each feature point. This step will be explained in greater detail in the subsequent description. The updated feature positions are then passed to the "constrain shape" step 330.

During the "constrain shape" step 330, the feature point positions are limited to plausible relative locations based on a model of the object shape. Persons skilled in the art will recognize that numerous methods exist for modeling the object shape and limiting the relative positions of the feature points. In a preferred embodiment, the shape can be modeled as in the Active Shape Model technique described by Cootes et al.

In the Active Shape Model technique, a model of the shape of an object is constructed by analysis of a set of example shapes. These shapes are typically generated by manually annotating preferred feature positions on a set of exemplar images of an object. Principle components analysis is used to compactly model the range of allowable shapes in terms of the mean shape and the primary modes of shape variation. To encode a shape model using PCA, the exemplar shapes are first aligned to a similar position, scale, and orientation. The aligned feature coordinates of each example shape can be arranged into a vector $x_i$. The covariance matrix S is produced from the expression:

$$S = \frac{1}{N} \sum_{i=1}^{N} (x_i - \bar{x})(x_i - \bar{x})^T,$$

where N is the number of ground truth examples. An ordered list of the principal modes of shape variation are given by the unit eigenvectors $v_k$ (k=1, ..., 2N) such that $$Sv_k = \lambda_k v_k,$$

where $\lambda_k$ is the $k^{th}$ eigenvalue and $\lambda_k \geq \lambda_{k+1}$. The majority of the shape space can often be represented with relatively few of the primary modes of variation.

Figure 4:
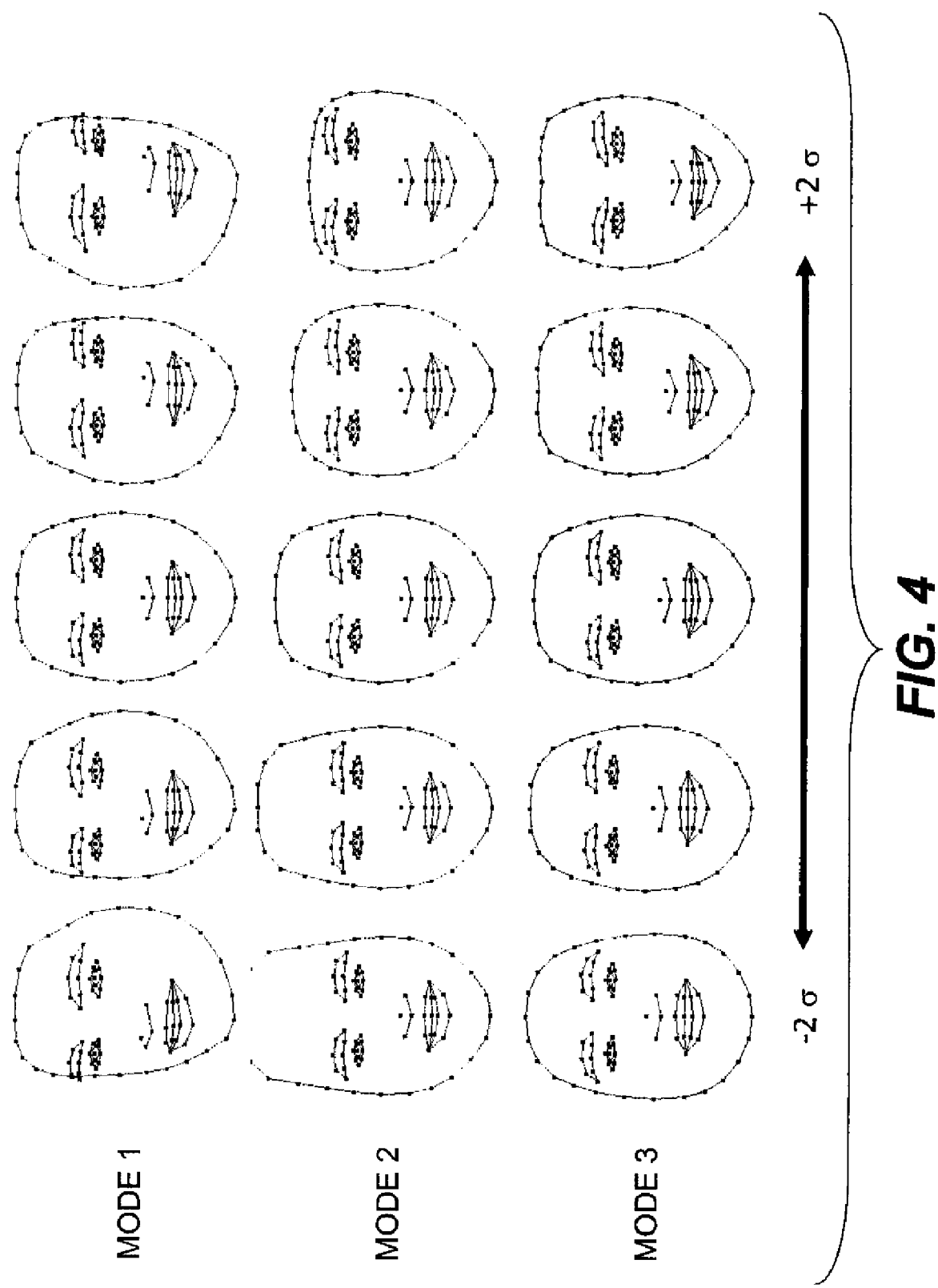
FIG. 4 is an illustration of the three most significant modes of an exemplar face shape model.

FIG. 4 illustrates the three most significant modes of an exemplar facial shape model. The portrayed shapes are the results of varying the mean shape two standard deviations (±2σ) along the given eigenvector. It is interesting to note that the primary modes are often related to semantically meaningful variations in the face shape. For instance, the first mode is related to horizontal rotation of the face, the second mode is associated to the position of the hairline, and the third mode is correlated with vertical tilt of the face.

An arbitrary shape can be approximated from the mean shape and a linear combination of perturbations along these modes using the forward equation $$x = \bar{x} + Vb,$$

where $V = (V_1\ V_2\ \ldots\ V_M)$ is the matrix of the first M eigenvectors, and $b = (b_1\ b_2\ \ldots\ b_M)^T$ is a vector of weights. The vector of weights forms the parameters of the shape model and can be computed from a given set of feature positions from the inverse expression $$b = V^T(x - \bar{x}).$$

In a preferred embodiment, the aforementioned shape model is used to constrain a given shape to the range of plausible relative feature positions. To constrain a given shape, the above equation is used to determine the vector of weights for the given shape and the values of the weights are limited to a suitable range. Suitable limits can be derived from the eigenvalues that specify the variance of the ground truth along each mode. One possibility is to limit the weights to a range of 3 standard deviations along each mode. This can be accomplished by clipping the weights so that $$-3\sqrt{\lambda_k} \leq b_k \leq 3\sqrt{\lambda_k}.$$

Alternatively, the closest weights can be chosen such that the Mahalanobis distance ($D_m$) from the mean is less than a suitable value ($D_{max}$):

$$D_m^2 = \sum_{k=1}^{M} \left( \frac{b_k^2}{\lambda_k} \right) \leq D_{max}^2$$

The constrained shape is then given by applying the forward equation to the constrained weights.

Referring again to FIG. 3, an optional convergence test is performed at the "converged" decision box 340. In a preferred embodiment this test determines whether the positions of the feature points have converged upon a stable result. This can be accomplished by keeping track of the previous position of the feature points and determining whether any of the feature points have moved more than a given tolerance. Alternatively, other stopping criteria could be employed. Such criteria include, but are not limited to, testing for stability of the appearance (instead of the position) at the feature points, or testing whether a fixed number of iterations have been exceeded. Any of these tests may be used in isolation or in combination and still adhere to the spirit of this invention. If the convergence test is not satisfied, steps 320-340 are repeated until the test is satisfied. Once the convergence test has been satisfied, the final feature positions are output as the result.

Figure 5:
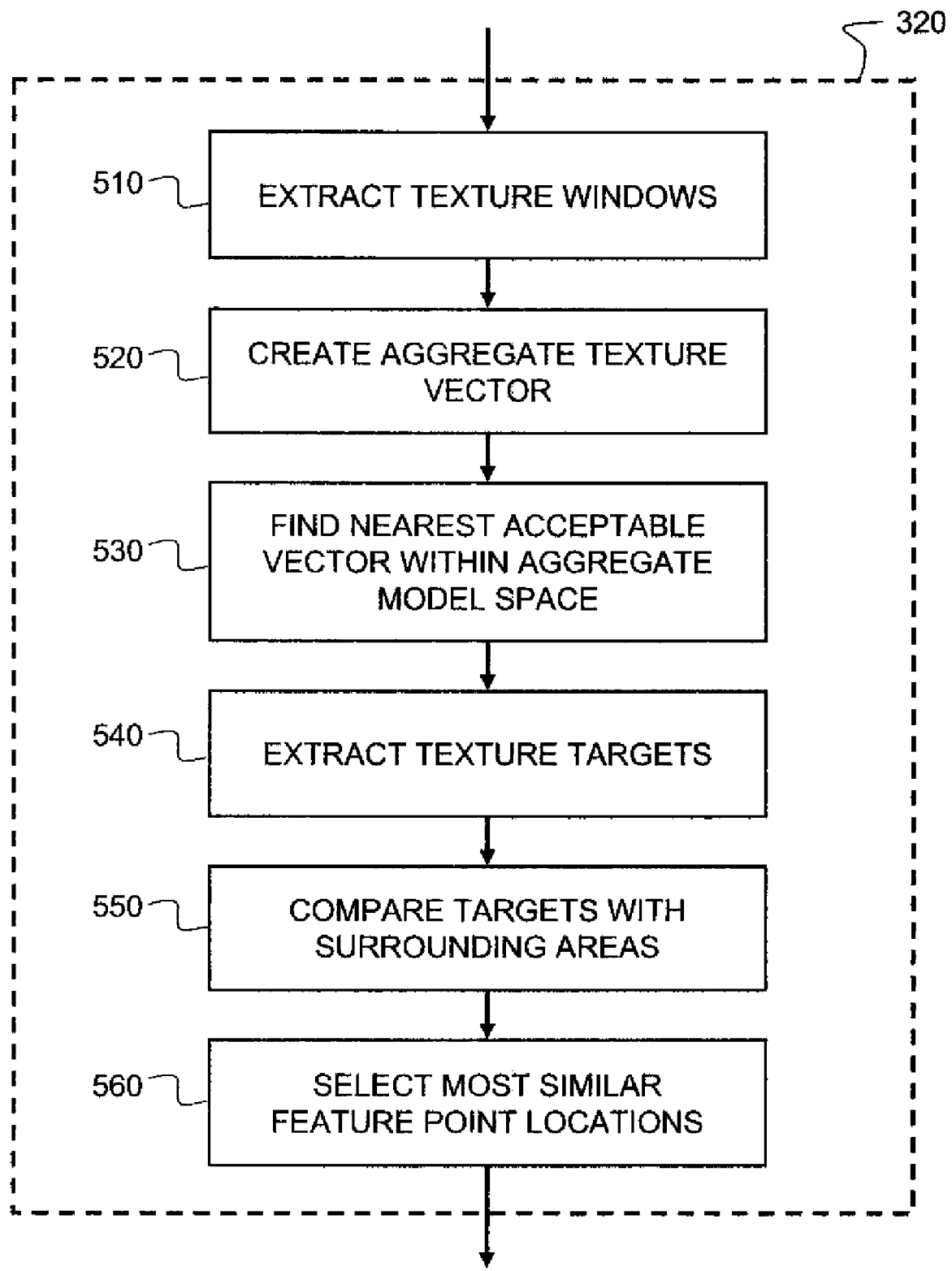
FIG. 5 is a flowchart of the find new feature point positions operation.

Referring now to FIG. 5, a flow chart of the "find new feature point positions" operation 320 is shown. This operation seeks to find new feature point positions using a model of the aggregate appearance of the object in the local neighborhoods of all feature points. In a preferred embodiment, the operation comprises the steps of extracting texture windows 510, creating an aggregate texture vector 520, finding the nearest acceptable vector within the aggregate model space 530, extracting texture targets 540, comparing the texture targets with the surrounding areas 550, and selecting the most similar feature point locations 560.

Figure 6:
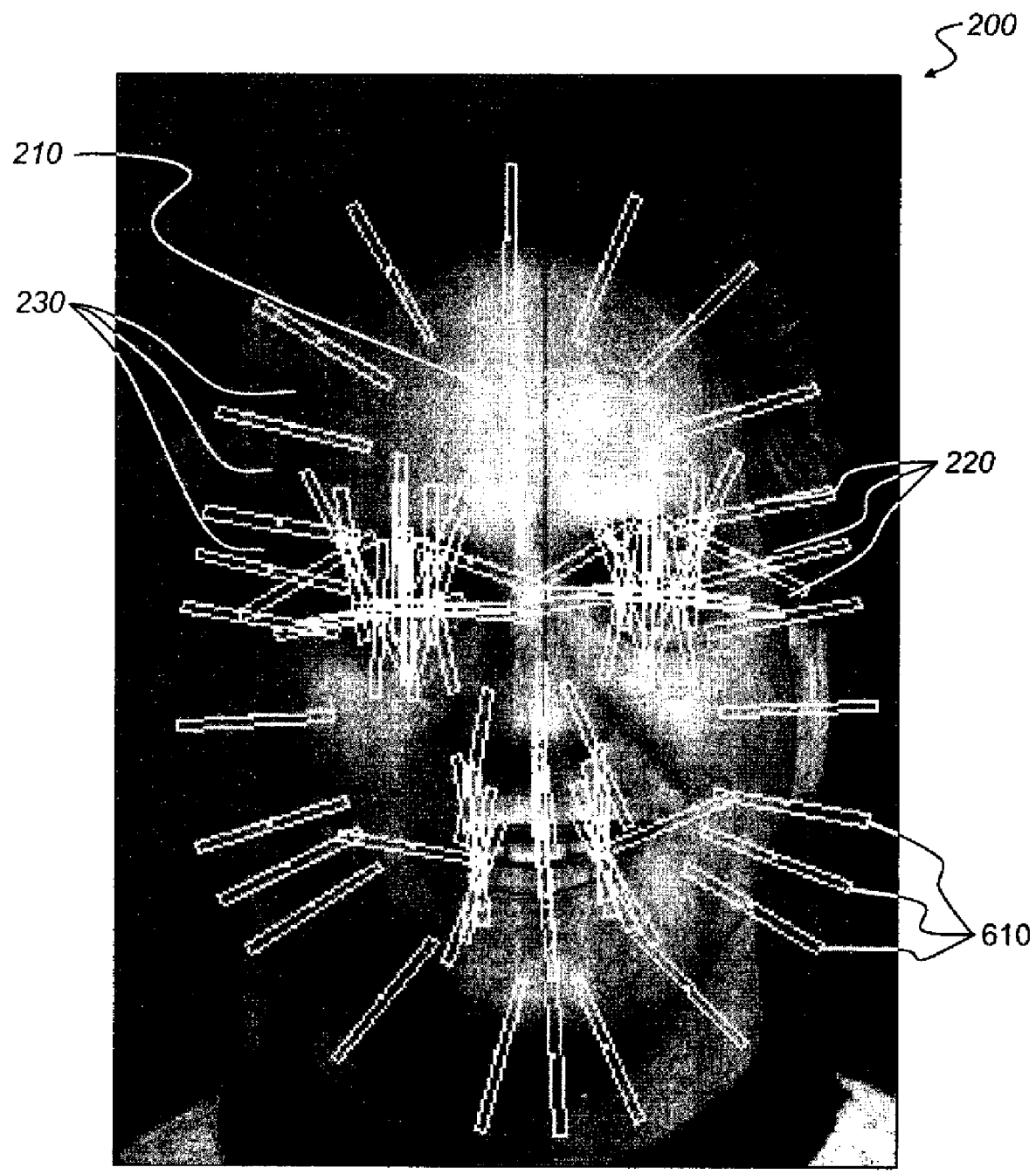
FIG. 6 is an illustration of the texture window positions for an example object (a face).

In the "extract texture windows" step 510, the contents of the image are extracted in the local neighborhoods of the feature points. It is generally useful to align these windows in a consistent position, orientation, and scale relative to the shape. In a preferred embodiment, rectangular windows of the image are extracted with the longer axis of the window oriented in a direction that is normal to the shape boundary. FIG. 6 illustrates the positions of the texture windows 610 for an example object of a face.

Referring again to FIG. 5, the contents of the texture windows at the feature points are combined into a single entity in the "create aggregate texture vector" step 520. In a preferred embodiment the aggregate texture vector can be created by concatenating interleaved RGB color channels of the appearance at a fixed number of evenly distributed positions (or pixels) within the texture windows. This vector forms a representation of the current aggregate appearance of the object in the local neighborhoods of the feature points.

In the "find nearest acceptable vector within the aggregate model space" stage 530, a model of the expected aggregate appearance of the object in the local neighborhoods of the feature points is used to find an aggregate texture vector that is nearest to the appearance of the object at the current feature positions. This nearest acceptable vector will be used to generate targets for subsequent searches for the feature positions.

Those skilled in the art will recognize that there are a variety of ways to construct a model of the expected aggregate appearance of the object in the local neighborhoods of the feature points. In a preferred embodiment, principle components analysis is used to compactly model the range of typical appearances in terms of the mean appearance and the primary modes of appearance variation. To construct the model, a set of exemplar images of the object are manually annotated with the preferred feature positions. The aggregate texture vector $y_i$ is extracted for each example image. The covariance matrix R is produced from the expression:

$$R = \frac{1}{P} \sum_{i=1}^{P} (y_i - \bar{y})(y_i - \bar{y})^T,$$

where P is the number of ground truth examples. An ordered list of the principal modes of appearance variation are given by the unit eigenvectors $u_k$ (k=1, ..., 2P) such that $$Ru_k = \delta_k u_k,$$

where $\delta_k$ is the $k^{th}$ eigenvalue and $\delta_k \leq \delta_{k+1}$. The majority of the appearance space can often be represented with relatively few of the primary modes of variation.

Figure 7:
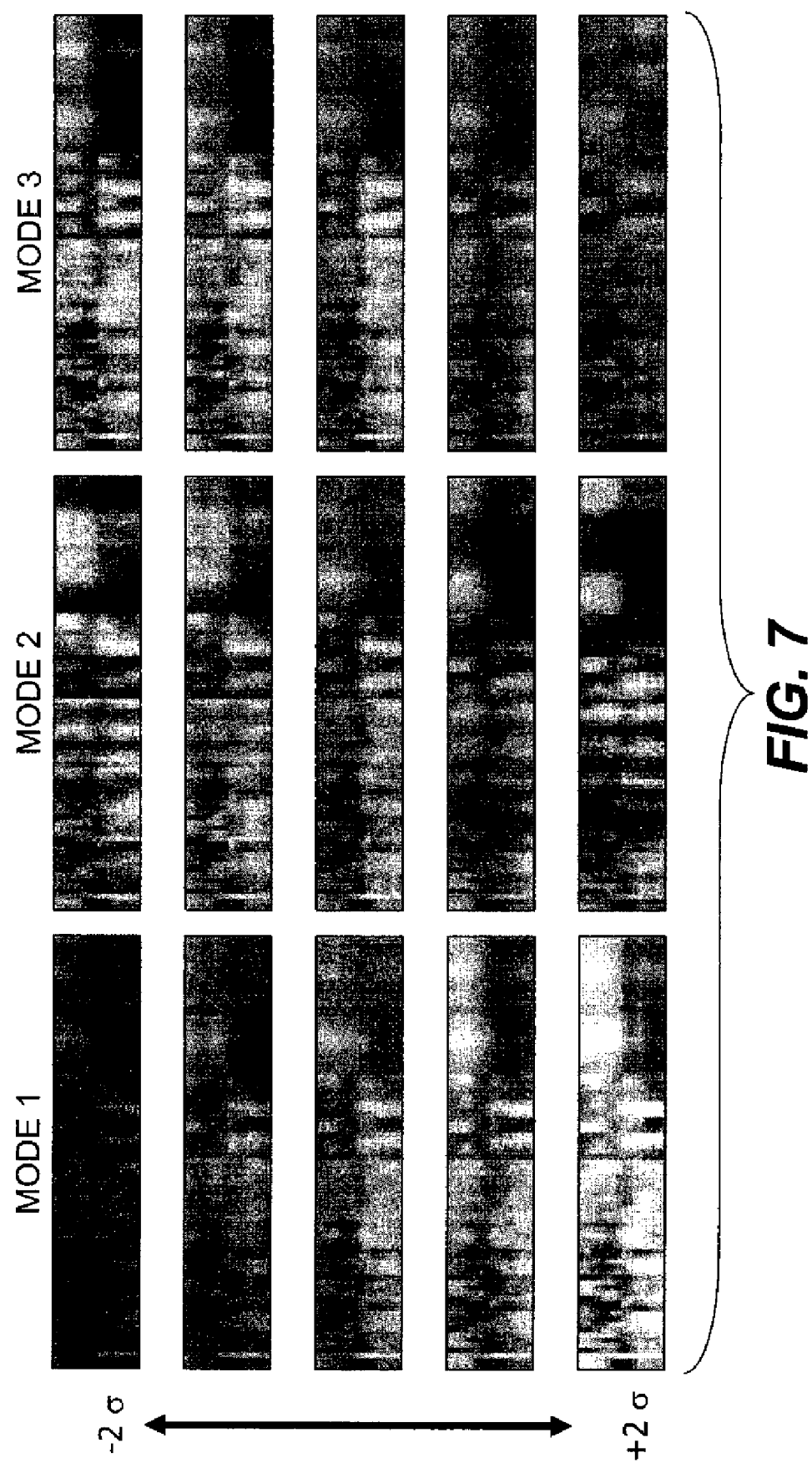
FIG. 7 is an illustration of the three most significant modes of an exemplar facial appearance model.

FIG. 7 illustrates the three most significant modes of an exemplar facial appearance model. In this visualization, the appearance of individual texture windows are organized as vertical columns and the texture windows from the various feature points are concatenated horizontally. The portrayed texture vectors are the results of varying the mean appearance two standard deviations (±2σ) along the given eigenvector. It is interesting to note that the primary modes are often related to semantically meaningful variations in the face appearance. For instance, the first mode is related to changes in the skin color (and/or illumination), the second mode is associated with difference in the lighting direction, and the third mode is correlated with variation in hair color.

An arbitrary appearance can be approximated from the mean appearance and a linear combination of perturbations along these modes using the forward equation $$y = \bar{y} + Ua,$$

where $U = (U_1 \; U_2 \; ... \; U_Q)$ is the matrix of the first Q eigenvectors, and $a = (a_1 \; a_2 \; ... \; a_Q)^T$ is a vector of weights. The vector of weights forms the parameters of the appearance model and can be computed from a given aggregate texture vector from the inverse expression $$a = U^T(y - \bar{y}).$$

In a preferred embodiment, the aforementioned appearance model is used to find the nearest acceptable vector within the model space. This may be accomplished by constraining the current aggregate texture vector to the range of plausible appearances. To constrain a given aggregate texture vector, the above inverse expression is used to determine the vector of weights for the given appearance and the range of these values are limited to a suitable range. Suitable limits can be derived from the eigenvalues that specify the variance of the ground truth along each mode. One possibility is to limit the weights to a range of 3 standard deviations along each mode. This can be accomplished by clipping the weights so that $$-3\sqrt{\delta_k} \leq a_k \leq 3\sqrt{\delta_k}.$$

Alternatively, the closest weights can be chosen such that the Mahalanobis distance ($D_m$) from the mean is less than a suitable value ($D_{max}$):

$$D_m^2 = \sum_{k=1}^{M} \left( \frac{a_k^2}{\delta_k} \right) \leq D_{max}^2$$

The nearest acceptable vector is then given by applying the forward equation to the constrained weights.

Referring again to FIG. 5, texture targets are obtained from the nearest acceptable vector in the "extract texture targets step" 540. These targets are obtained be applying the inverse of step 520. Individual texture targets are extracted from the appropriate positions within the nearest acceptable vector. These texture targets indicate the expected appearance at individual feature points given the aggregate appearance at all feature points.

During the "compare targets with surrounding areas" step 550, the texture target for each feature point is compared with the contents of the image surrounding the given point in order to find the best match. This can be accomplished by comparing the texture target with similarly sized texture windows at a variety of locations within the local neighborhood of the feature point. Those skilled in the art will recognize that there are a variety of commonly understood error metrics that can be used to perform this comparison. These metrics include, but are not limited to, absolute difference, mean squared error, or normalized correlation.

Additional error terms may also be combined with the above error metric. For instance, the traditional Active Shape Model technique uses independent models of the local appearance around each feature point. Independent models can be produced by a variety of mechanisms including calculating the covariance matrix of the appearance around a given point using a set of exemplar manually annotated images. The covariance matrix can be used to perform matching using a Mahalanobis error metric. These independent models provide a useful basis for selecting feature positions, especially during the first few iterations of the method. A transfer function can be employed to weight the error term based on the independent models more significantly during the early iterations of the method, and then weight the error term based on the aggregate appearance model more significantly during the later iterations.

In the "select most similar feature point locations" step 560, the location is selected for each feature point that best matches the appearance model. This position is generally chosen as the location with lowest error using the selected error metric. The resultant feature positions form the new estimates and are passed to the "constrain shape" step 330.

Optionally, the object finding method may be employed within a multi-resolution framework. This efficiently extends the range over which features can be accurately identified. The multi-resolution version of the algorithm initially searches the image using large, coarse appearance models and wide search areas. The approximate feature positions are then refined using successively smaller and finer texture models and narrower search areas.

Multiple aggregate appearance models need to be created in order to employ the method within a multi-resolution framework. In a preferred embodiment, the aggregate appearance models range from a coarse to a fine scale. The coarse appearance model employs texture windows that cover a larger region around a feature point, and the finer models cover successively smaller regions. Typically each finer scale covers half the extent of the next coarser scale. An equivalent number of pixels is typically used to represent all scales (i.e. a coarser sampling is used for coarser scales). FIG. 8a illustrates the positions and extent of the multi-resolution texture windows 810-830 for an example object of a face. Aggregate appearance models are created independently for each scale using the method described in step 530.

Referring to FIG. 8b, a flow chart of the multi-resolution object finding method is shown. Steps 850-880 function as described in steps 310 to 340 in the single-resolution method. Initially the coarsest appearance model and the widest search areas (i.e. the local neighborhoods of the feature points that are compared with the texture targets) are used in step 860.

In the "finest resolution" decision box 890, a check is performed to determine if the finest resolution appearance model and narrowest search areas were employed at the most recent pass through step 860. If this was not the case, then the next finest resolution appearance model and the next narrower search areas are set to be used at the subsequent pass through step 860, and steps 860 to 890 are repeated. If the finest resolution appearance model and narrowest search areas were employed at the most recent pass through step 860 then the method is complete and the final feature positions are output.

The object finding algorithm disclosed in the preferred embodiment(s) of the present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to enhance or alter a digital image), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cellphone that can be used as a processing unit, a display unit, or a unit to give processing instructions), as a service offered via the World Wide Web, software and systems for performing computer aided detection (CAD) for medical applications, and within Picture Archiving and Communication Systems (PACS) for segmenting and visualization anatomical data.

In each case, the algorithm may stand alone or may be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm(s) themselves can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention has been described in detail with particular reference to certain preferred embodiments thereof, but it will be understood that variations and modifications can be effected within the scope of the invention.

PARTS LIST 110 computer system
112 microprocessor-based unit
114 display
116 keyboard
118 mouse
120 selector on display
122 disk drive unit
124 compact disk—read only memory (CD-ROM)
126 floppy disk
127 network connection
128 printer
130 personal computer card (PC card)
132 PC card reader
134 digital camera
136 camera docking port
138 cable connection
140 wireless connection
200 example image of an object
210 example object
220 feature points
230 connections between feature points
310 initialize location step
320 find new feature point positions step
330 constrain shape step
340 converged decision box
510 extract texture windows step
520 create aggregate texture vector step
530 find nearest acceptable vector step
540 extract texture targets step
550 compare targets with surrounding areas step
560 select most similar feature point locations step
610 texture windows
810 coarse resolution texture windows
820 medium resolution texture windows
830 fine resolution texture windows
850 initialize location step (multi-resolution method)
860 find new feature point positions step (multi-resolution method)
870 constrain shape step (multi-resolution method)
880 converged decision box (multi-resolution method)
890 finest resolution decision box (multi-resolution method)

The invention claimed is:

1. A method of finding an object in an image comprising:
    (a) describing an object shape by one or more sets of feature points;
    (b) estimating positions of the feature points;
    (c) finding new locations for each feature point based on a first appearance model, having a first resolution, of an aggregate appearance of the object in local neighborhoods of all feature points; and
    (d) constraining the positions of the feature points based on a shape model;
    wherein step (c) of finding new locations for each feature further comprises:
        (c1) extracting windows of the image depicting an appearance in the local neighborhood of the feature points;
        (c2) concatenating the windows to create an aggregate texture vector;
        (c3) finding an acceptable vector within the appearance model space;
        (c4) extracting texture targets from the acceptable vector;
        (c5) comparing targets at locations surrounding the feature points; and
        (c6) selecting most similar locations.

2. A method as in claim 1 further comprising:
    (e) testing for stopping criteria; and
    (f) if stopping criteria has not been reached repeat steps (c)-(f).

3. A method as in claim 2 further comprising:
    (g) testing if a final resolution has been reached; and
    (h) if final resolution has not been reached replace first the first appearance model with a second appearance model having a different resolution and repeat steps (c)-(h).

4. A method as in claim 1 wherein the feature points are connected in one or more sets.

5. A method as in claim 1 wherein the positions of the feature points are estimated by aligning an average relative positions of the feature points with an automatically or manually specified starting position.

6. A method as in claim 1 wherein the shape model is constructed by analyzing one or more exemplar shapes.

7. A method as in claim 6 wherein principle components analysis is applied to the exemplar shapes to develop the shape model.

8. A method as in claim 7 wherein the shape model is defined by an average shape and primary modes of shape variation.

9. A method as in claim 8 wherein:
    the shape model is used to constrain the positions of the feature points by limiting a range of shape variability along the primary modes of shape variation.

10. A method of finding an object in an image comprising:
    (a) describing an object shape by one or more sets of feature points;
    (b) estimating positions of the feature points;
    (c) finding new locations for each feature point based on a first appearance model, having a first resolution, of an aggregate appearance of the object in local neighborhoods of all feature points; and
    (d) constraining the positions of the feature points based on a shape model, wherein the shape model is defined by an average shape and primary modes of shape variation and is constructed by applying principal components analysis to analyze one or more exemplar shapes, and wherein the shape model is used to constrain the positions of the feature points by limiting a range of shape variability along the primary modes of shape by:
        (i) determining vector of weights for a current shape that form parameters of the shape model;
        (ii) constraining the vector of weights; and
        (iii) determining the shape that corresponds to the constrained vector of weights.

11. A method as in claim 10 wherein:
constraining the vector of weights is done by clipping the vector of weights to a given number of standard deviations of the exemplar shapes along each mode of the shape model.

12. A method as in claim 10 wherein:
constraining the vector of weights is done by finding the closest vector of weights such that Mahalanobis distance is within a suitable maximum value.

13. A method as in claim 2 wherein:
stopping criteria is elapsed time, stability of feature points, stability of appearance at the feature points, or number of iterations.

14. A method as in claim 1 wherein the windows of the image are aligned to a consistent position relative to a shape.

15. A method as in claim 1 wherein the appearance model is constructed by analyzing an appearance of one or more exemplar images depicting the object.

16. A method of finding an object in an image comprising:
(a) describing an object shape by one or more sets of feature points;
(b) estimating positions of the feature points;
(c) finding new locations for each feature point based on a first appearance model, having a first resolution, of an aggregate appearance of the object in local neighborhoods of all feature points; and
(d) constraining the positions of the feature points based on a shape model;
wherein the appearance model is constructed by analyzing an appearance of one or more exemplar images depicting the object by,
(i) determining preferred feature positions within the exemplar images;
(ii) extracting windows of the image depicting an appearance in the local neighborhood of the feature points;
(iii) concatenating an appearance windows for each exemplar image to create exemplar aggregate texture vectors; and
(iv) constructing an aggregate appearance model by analyzing one or more exemplar aggregate texture vectors.

17. A method as in claim 16 wherein principle components analysis is applied to the exemplar aggregate texture vectors to develop the appearance model.

18. A method as in claim 17 wherein the appearance model is defined by an average appearance and primary modes of appearance variation.

19. A method as in claim 1 wherein:
the appearance model is used to find an acceptable vector within the aggregate model space by constraining the appearance of the aggregate texture vector by limiting the range of appearance variability along the primary modes of appearance variation.

20. A method of constraining the appearance of the aggregate texture vector as in claim 19 comprising;
(a) determining vector of weights for a current aggregate texture vector that form parameters of the appearance model;
(b) constraining the vector of weights; and
(c) determining the aggregate texture vector that corresponds to the vector of weights.

21. A method as in claim 20 wherein:
constraining the vector of weights is done by clipping the vector of weights to a given number of standard deviations of the exemplar shapes along each mode of the shape model.

22. A method as in claim 20 wherein:
constraining the vector of weights is done by finding the closest weights such that the Mahalanobis distance is within a suitable maximum value.

23. A method as in claim 1 wherein the step of comparing targets at locations surrounding the feature points comprises:
measuring an error between the targets and similarly sized regions surrounding the feature points.

24. A method as in claim 23 wherein the error is measured using absolute difference, mean squared error, correlation, or normalized correlation.

25. A method as in claim 1 wherein the step of finding new locations for each feature point also utilizes independent models of a local appearance around the feature points.

26. A method as in claim 25 wherein the independent models are weighted more significantly during early iterations of the method and the aggregate model is weighted more significantly during the later iterations.

27. A method as in claim 3 wherein the different resolutions of the appearance model, span coarse to fine scales, wherein the coarser scales cover larger local neighborhoods of the feature points than the finer scales.

28. A method as in claim 27 wherein the coarsest aggregate appearance model is used in conjunction with a wide search area in a first iteration of the method, and successively finer appearance models and narrower search areas are used in subsequent iterations.

29. A method as in claim 1 wherein the method is a component of a software program stored on a computer-readable medium.

* * * * *